United States Patent [19]

Zaidi

[11] Patent Number: 5,353,420

[45] Date of Patent: Oct. 4, 1994

[54] METHOD AND APPARATUS FOR DECODING CONDITIONAL JUMP INSTRUCTIONS IN A SINGLE CLOCK IN A COMPUTER PROCESSOR

[75] Inventor: Syed A. A. Zaidi, Santa Clara, Calif.

[73] Assignee: Intel Corporation, Santa Clara, Calif.

[21] Appl. No.: 927,707

[22] Filed: Aug. 10, 1992

[51] Int. Cl.[5] .............................................. G06F 9/38
[52] U.S. Cl. ................................ 395/375; 364/231.8;
364/948.34
[58] Field of Search ......................... 395/375, 775, 800

[56] References Cited

U.S. PATENT DOCUMENTS

| | | | |
|---|---|---|---|
| 4,270,167 | 5/1981 | Koehler | 395/325 |
| 4,680,698 | 7/1987 | Edwards | 395/800 |
| 4,783,734 | 11/1988 | May | 395/650 |
| 4,794,526 | 3/1992 | Baum | 395/650 |
| 5,187,791 | 2/1993 | Baum | 395/725 |
| 5,220,669 | 6/1993 | Baum | 395/775 |

Primary Examiner—David Y. Eng
Attorney, Agent, or Firm—Blakely, Sokoloff, Taylor & Zafman

[57] ABSTRACT

In a pipelined microprocessor which includes a prefetch unit for obtaining a plurality of instructions to be processed; a decode unit having a prefix state machine for decoding prefixes and determining their lengths, a decode circuit for decoding instructions and generating microcode vectors to be executed, and apparatus for counting the length of an instruction; and a microcontroller for sequencing microcode vectors; the improvement including apparatus for detecting the appearance of a particular prefixed instruction, apparatus responsive to the detection of the particular prefixed instruction for disabling the prefix state machine, apparatus in the decode circuit for decoding the particular prefixed instruction and causing the decode circuit to generate microcode vectors for the instruction, and apparatus for generating a request to the microcontroller to handle microcode vectors generated.

10 Claims, 4 Drawing Sheets

METHOD AND APPARATUS FOR DECODING CONDITIONAL JUMP INSTRUCTIONS IN A SINGLE CLOCK IN A COMPUTER PROCESSOR

BACKGROUND OF THE INVENTION

Field of the Invention

This invention relates to computer processors and, more particularly, to methods and apparatus for increasing the speed of operation of such processors.

History of the Prior Art

Computer designers are continually attempting to make computers run faster. One way in which this may be accomplished is to make the computer process instructions faster.

Intel Corporation manufactures a line of microprocessors including the 8086, 8088, 80286, i386 TM, and i486 TM microprocessors (hereinafter referred to as the Intel microprocessors) which are used in the great majority of the personal computers presently manufactured. The instructions used by the Intel microprocessors are quite complicated. For example, instructions can vary in length from one to fifteen bytes. An instruction may be as simple as a single byte of opcode. On the other hand, an instruction may have a prefix field of from zero to four bytes, an opcode field of one byte, a ModR/M field of one byte, a SIB field of one byte, a displacement field of up to four bytes, and an immediate field of up to four bytes. The details of the individual elements of instructions are described in i486 Microprocessor, Programmer's Reference Manual, published by Osborne McGraw-Hill, 1990, pp. 26-1 et seq.

The opcode portion of the instruction specifies the operation to be performed by the instruction. A prefix precedes and somehow modifies what the opcode instruction normally accomplishes. One prefix varies the meaning of the opcode for an instruction and may cause the opcode to indicate a jump instruction. When a prefixed instruction is encountered by the decoding unit of prior art Intel microprocessors, the prefix bytes are handled by the decode unit separately; and each byte of prefix requires one clock period to decode. While the prefix bytes, if they exist, each take a clock period to decode, the opcode, MODR/M, SIB, displacement, and immediate bytes are all captured and decoded together in the same clock period. In prior art Intel microprocessors, this slows the decoding of the prefixed form of jump instruction because of the extra clock required to decode the prefix byte.

It is desirable to reduce the delay caused by prefix bytes for jump instructions in a microprocessor using the Intel instruction set.

SUMMARY OF THE INVENTION

It is, therefore, an object of the present invention to accelerate the operation of a microprocessor. It is another more specific object of the present invention to eliminate the delay due to prefixed jump instructions in a microprocessor running the Intel instruction set.

These and other objects of the present invention are realized in a pipelined microprocessor which includes a prefetch unit for obtaining a plurality of instructions to be processed; a decode unit having a prefix state machine for decoding prefixes and determining their lengths, a decode circuit for decoding instructions and generating microcode vectors to be executed, and means for counting the length of an instruction; and a microcontroller for sequencing microcode vectors; by the improvement comprising: means for detecting the appearance of a particular prefixed instruction; means responsive to the detection of the particular prefixed instruction for disabling the prefix state machine, means in the decode circuit for decoding the particular prefixed instruction and causing the decode circuit to generate microcode vectors for the instruction; and means for generating a request to the microcontroller to handle microcode vectors generated.

These and other objects and features of the invention will be better understood by reference to the detailed description which follows taken together with the drawings in which like elements are referred to by like designations throughout the several views.

Notation And Nomenclature

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

Making a computer run faster by making it process instructions faster is a difficult task. It is an especially difficult process with the Intel microprocessors. As each new computer processor in the line of Intel microprocessors was designed, scrupulous attention was paid to assuring that it would be able to process all of the instructions of the earlier microprocessors. In this way, each new processor had a base of application programs which it was able to run when it was introduced.

However, in order to accomplish this result, the Intel microprocessors have a relatively involved memory architecture which affects the structure of instructions and how they are processed. The Intel microprocessors use two basic forms of memory management, segmentation memory management and virtual memory management (paging).

Segmentation memory management allows the address space to be divided into multiple independent address spaces (segments) each defined by a segmentation base address and a segment length. The information stored in any particular segment has an address which is a combination of the segment base address and an offset into the segment.

In order to access memory using the segmentation form of memory management, an application program uses an address referred to as a logical address which includes various values used to compute an offset into a segment. Segmentation hardware of the memory management portion of the computer translates the logical address into a linear address which is both the address of the segment and the am offset address within the continuous segment address space. To determine an offset address within a segment, a displacement, an index, a base, and a scale may be used and combined in various ways. The offset is combined with the segment base address to provide the linear address. If paging is operating, paging hardware then translates the linear address into a physical address. Otherwise, the linear address is the physical address.

The Intel microprocessors utilize the instructions themselves and registers to store the various components which are used to form the linear addresses used in segmentation memory management. For example, instructions include displacement values used to compute offset. The instructions also designate registers of the Intel microprocessors in which the base, index, and scale values used to compute the offset into each segment in memory are stored.

Thus, the instructions used by the Intel line of microprocessors include fields used to address segments of varying types using displacement, base, index, and scale values. The instructions are of variable length and can be from one to fifteen bytes. An instruction may consist of several fields. The number of fields in a logical instruction may include from zero to four bytes of prefix information, one byte of opcode, zero or one byte of ModR/M information, zero or one byte of SIB information, from zero to four bytes of displacement information, and from zero to four bytes of immediate information. All of the field is other than the opcode are optional. The minimum length is a one byte instruction which contains only the opcode defining a particular operation.

When an instruction is decoded by the decoding unit of an Intel microprocessor, each of the individual portions of the instruction must be decoded in a manner appropriate to that particular portion. Each portion of an instruction must be correctly recognized so that it may be correctly interpreted. If a portion of an instruction is interpreted incorrectly, then other portions of the instruction and other instructions may be misinterpreted. This is a primary reason that accelerating the processing of instructions is difficult.

When an instruction is encountered by the decoding unit of previous Intel microprocessors, the prefix bytes are handled by the decode unit separately, and each byte of prefix requires one clock period to decode. While the prefix bytes, if they exist, each take a clock period to decolde, the opcode, MODR/M, SIB, displacement, and immediate bytes are all captured and decoded together in the same clock period.

One form of prefix is used with the instruction opcode to vary the meaning of the instruction. Some of these varied instructions become jump instructions when so prefixed. In earlier Intel microprocessors, this slows the decoding of this form of jump instruction because of the extra clock period required to decode the prefix byte.

Figure 1A:
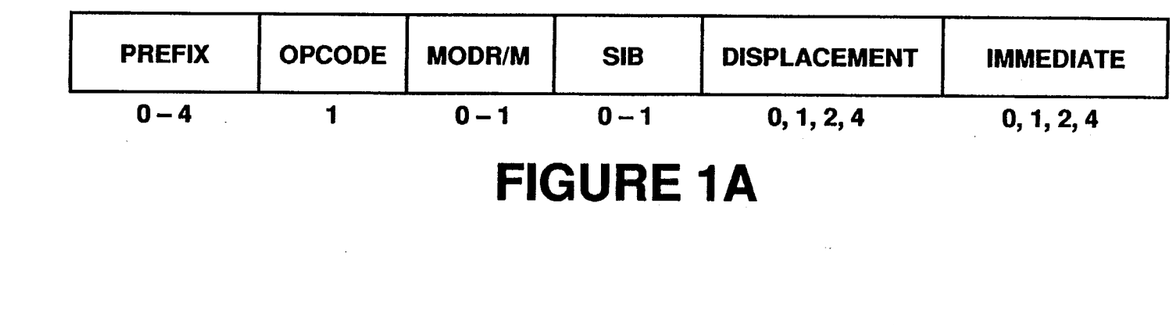
FIGS. 1(a), (b), (c) are diagrams which illustrates the instruction format and two instructions used in the Intel i486 microprocessor.

FIG. 1(a) illustrates the instruction format used in the Intel i486 microprocessor. The instruction is divided into a plurality of fields.

A first field may include a number of bytes of prefix information. A prefix precedes and somehow modifies what the instruction normally accomplishes. A prefix may vary the meaning of the opcode which indicates what an instruction is to accomplish; a prefix may change the segment register to some register other than a default register; a prefix may change the address from sixteen to thirty-two bits; a prefix may change the data size from sixteen to thirty-two bits; a prefix may cause an instruction to be repeated with each element of a string; or a prefix may indicate a locked read/modify/-write sequence. Logical instructions may include a maximum of four prefix bytes but any number of bytes providing an instruction no longer than fifteen bytes might be used for other purposes. One prefix which varies the meaning of the opcode for an instruction may cause the opcode to indicate a jump instruction.

A second field includes one byte of opcode which selects the particular operation to be performed. The opcode may also include smaller fields which define the direction of operation, the size of displacements, an encoding for a register holding an operand used in an instruction, or a sign extension. The opcode byte may include an addressing-mode specifier which indicates whether an operand used by the instruction is held in a register or a memory location.

A third field may include an addressing form or MODR/M byte. Most instructions which refer to an operand in memory have an addressing form byte following the opcode byte which includes the addressing mode specifier. This MODR/M byte indicates whether an operand used by the instruction is held in a register or in a memory location and, if in memory, whether displacement, base, and index values, and scaling factors are to be used in obtaining the offset needed for addressing. It may include the encoding for an operand register and the encoding for a base register if no SIB byte is included in the instruction.

A fourth scale/index/base (SIB) field of one byte may be used to encode a base register, an index register, and a scaling factor in thirty-two bit addressing where the addressing-mode specifier of the ModR/M field indicates indexing is to be used in computing the offset address.

A fifth displacement field of one, two, or four bytes may be included when the addressing-mode specifier indicates that a displacement is to be used to compute the offset address of an operand. The displacement value is encoded as a signed integer of eight, sixteen, or thirty-two bits.

A sixth immediate field of one, two, or four bytes allows an operand to be stored as a part of the instruction.

In any instruction used by the i486 microprocessor, certain of these instruction fields are used and certain are not used. For example, prefix fields are used less often than some other fields. Because different fields are included in different instructions, instruction lengths differ from instruction to instruction; and the decoder must be able to discern one field from another.

In all prior art Intel processors, when a prefix field is a part of the instruction, each byte of the prefix field is decoded separately from the other portions of the instruction in a prefix state machine; and each byte of prefix takes one clock period to decode. This occurs because the prefix field typically generates a signal which varies some part of the operation. For example, one prefix (OFhex) varies the meaning of the opcode by directing the decoder to another portion of the microcode ROM than it would normally access to find the microcode vector for the instruction.

Figure 1B:
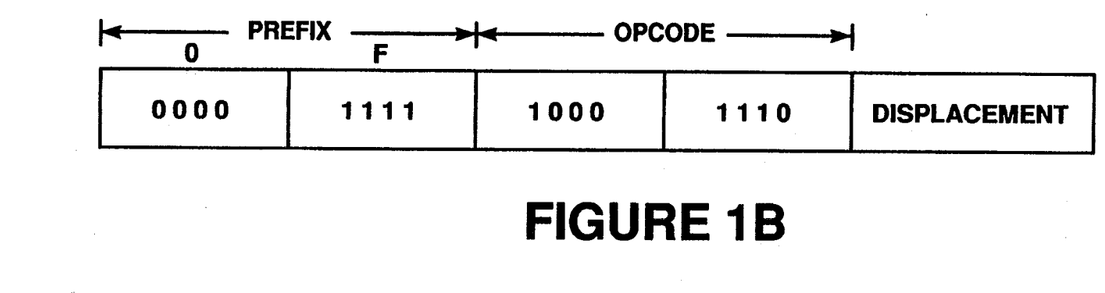
Figure 1C:
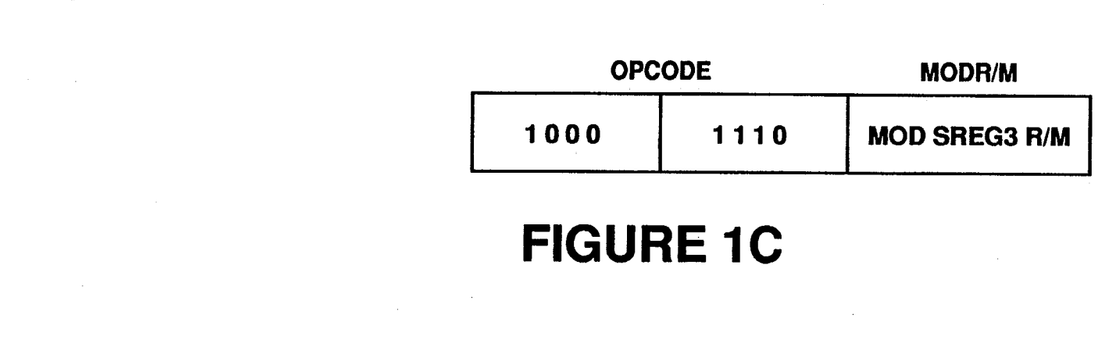

FIG. 1(b) illustrates the coding for a "Jump on Less or Equal/Not Greater" instruction, while FIG. 1(c) illustrates the coding for a "Move Register Memory to Segment Memory" instruction. As may be seen, the opcode field for each of these instructions is identical; however, the jump instruction has an OF(hex) prefix. Thus, although the opcode is the same, entirely different operations are indicated by the two instructions. It should be noted that jump instructions are not the only instructions having an OF prefix, but they are the only instructions with which the present invention is used in the preferred embodiment.

Figure 2:
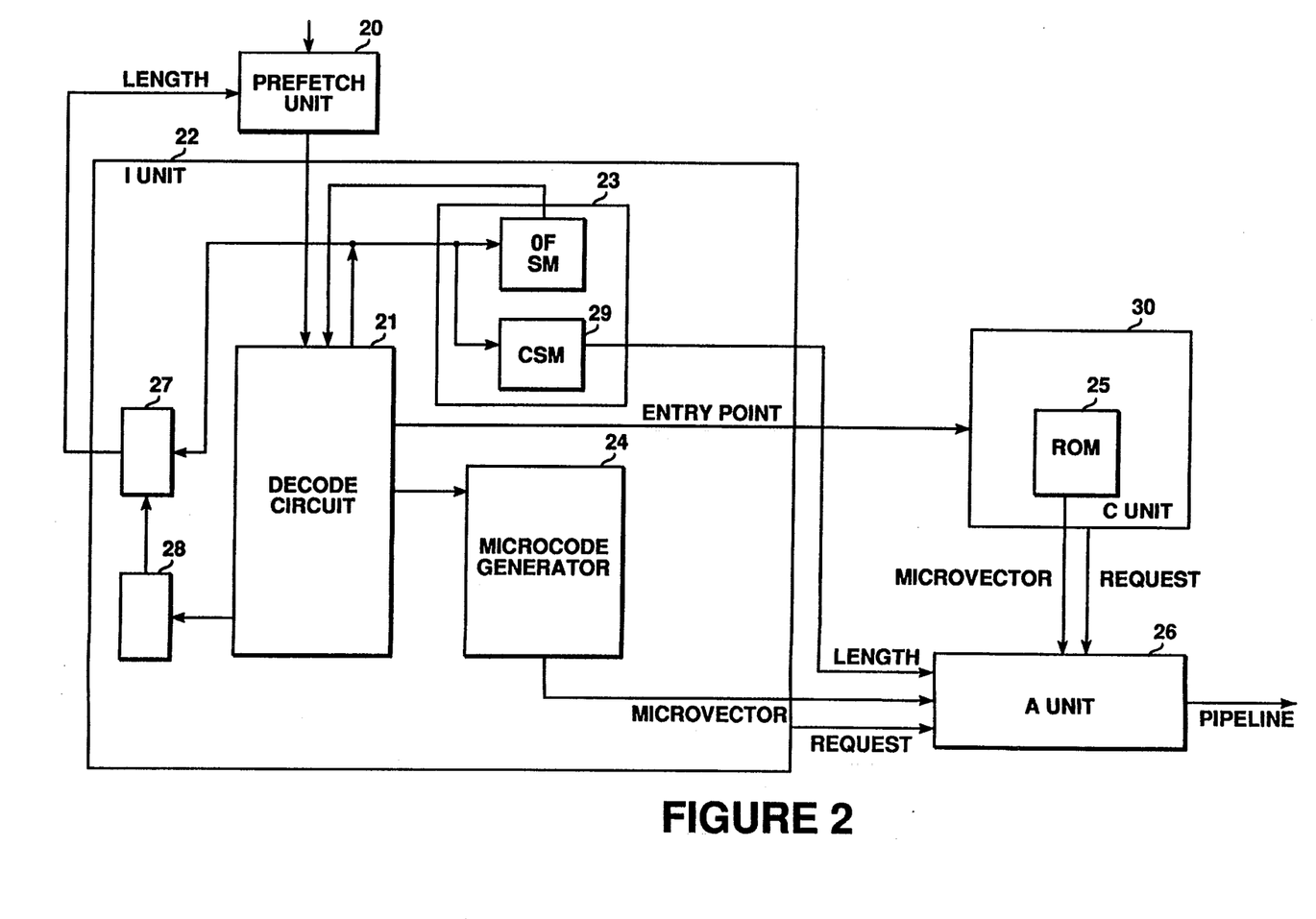
FIG. 2 is a block diagram of a portion of a microprocessor which may utilize the present invention to accelerate the processing of instructions.

FIG. 2 illustrates a basic block diagram of a portion of a microprocessor which may be modified to utilize the present invention to accelerate the processing of instructions. FIG. 2 is used to describe how the circuitry operates before the inclusion of the present invention. The microprocessor is designed to pipeline instructions so that the stages of sequential instructions are overlapped; and, in general, no portion of the processor lies idle while any particular stage of an instruction is being carried out. Optimally, the processors are designed to pipeline instructions so that each instruction may be handled in stages each of which takes one clock period. The typical stages of a pipelined instruction include a stage in which an instruction is fetched from storage, one in which it is decoded, a stage in which the instruction is executed, and a final stage in which the results of the execution are written back to storage for later use. By pipelining instructions, the overall speed of operation is significantly increased.

The portion of the microprocessor illustrated includes a prefetch unit 20 which fetches from storage the instructions to be processed so that they are ready to be decoded. The prefetch unit 20 fetches a number of instructions at the same time in order to speed the operation of the processor. Since these instructions may be of varying lengths, it is necessary to select and transfer for decoding an instruction which is of a proper length to include only the amount of data correct for that instruction. In order to assist in this, the prefetch unit 20 utilizes prefetch pointers generated by information provided by the decode circuitry 21 of the I (decode) unit 22 to indicate the beginning of each next instruction to be processed. By using a pointer to the beginning of an instruction and generating a pointer to the beginning of the next instruction, the length of an instruction may be correctly determined. Circuitry for generating these prefetch pointers is disclosed in U.S. Pat. application Ser. No. 07/831,825, entitled Rotators in Machine Instruction Length Calculation, Grochowski et al, filed Feb. 6, 1992, and assigned to the assignee of the present invention.

Instructions are provided by the prefetch unit 20 to the I unit 22 which decodes each instruction, generates microcode vectors in response to the decoded values, and transfers the microcode vectors generated to the pipeline for execution along with a request to the pipeline to accept the instruction. The I unit 22 includes the decode circuitry 21 which decodes all instructions and initiates the various operations necessary to provide the microvectors that make up an instruction. The decode circuitry 21 is typically a large programmed logic array (PLA). Programmed logic arrays are well known to those skilled in the art. The I unit 22 also includes a prefix state machine 23. The prefix state machine 23 actually includes a number of individual state machines each of which handles one of the different types of prefixes discussed above. Each of the individual prefix state machines included in the state machine 23 is a two-state state machine that receives the signals generated by the decoding of one particular prefix by the decoder circuitry 21, recognizes the signals for that prefix, and provides signals indicating the meaning of the prefix to the decode circuitry 21 and other circuitry of the I Unit 22.

These signals generated by the prefix state machine essentially vary the manner in which the I Unit decode circuitry 21 responds to a particular opcode. For example, the decode circuitry 21 of the I Unit 22 receives the opcode and decodes it to produce signals which, without a prefix, may cause microcode vectors to be generated by a particular portion of a microcode generating section 24 of the I Unit 22 (and for longer instructions not involved in the present invention, by a microcode ROM section 25 of a C Unit 30). In the presence of one type of prefix signal (OFhex prefix), the signals generated by decode circuitry 21 of processors prior to those using the present invention cause microcode vectors to be generated by a different section of the microcode generating circuit 24. Typically, the microcode generating circuit 24 is read only memory; however, in one embodiment using the present invention, the microcode generating circuit 24 is a PLA.

Two important control signals are generated in the decoding by the I Unit 22 of a typical instruction. First, the length of the instruction is counted by circuitry represented by a counter 28 in the decode circuitry 21. This length value is furnished to a prefetch pointer generator 27 so that a pointer to the beginning of the next instruction may be generated. The counter 28 essentially counts the number of bytes in the instruction. It does this by counting the opcode, ModR/M, and SIB bytes as a group, the displacement bytes as a group, the immediate bytes as a group, and adding the bytes counted. The details of circuitry for accomplishing this are disclosed in U.S. Pat. application Ser. No. 07/831,825, referred to above.

This count by the counter 28 does not include the length of any prefix. In fact, the length of each prefix in an instruction is separately sensed as one byte by the prefetch pointer generator 27. The prefetch pointer generator 27 treats the signal indicating a prefix generated in the original decoding of the prefix by the decode circuitry 21 as an indication that one is to be added to the count. Thus, the prefetch pointer value generated by the prefetch pointer generator 27 is incremented by one byte whenever a prefix is encountered in order to provide proper alignment of the following instruction from the prefetch unit. The count of the number of prefixes is also maintained by a prefix count state machine 29 which is a part of the prefix state machine 23, and this count value is used in computing the instruction length for use later in the pipeline.

A second control signal is generated whenever an instruction which is decoded by the I Unit decode circuitry 21. This signal is a request to an A Unit 26 which follows the decode unit 22 in the pipeline. This request essentially communicates that the I Unit has a microcode vector which is to be transmitted to the next stage of the pipeline for execution. The A Unit 26 is a microcontroller which sequences the transfer of microcode vectors to the pipeline from the I Unit 22 and from the C Unit 30 and uses these requests in order to help accomplish that sequencing. It should be noted that the OF prefixed jump instruction does not require the use of the C unit 30 since only a single microcode vector is generated and that is generated by the I unit 22. However, the A unit still expects a request from the I unit for microvectors that unit may generate. In the Intel processor illustrated in FIG. 2, the generation of signals by the decode circuit 21 for the prefix state machine 23 in response to a prefix byte does not cause the decode circuitry 21 of the I Unit to generate a request to the A unit because the prefix itself does not generate a microcode vector which is transferred to the pipeline but only helps select which vector will be decoded by the I Unit decode circuitry 21 from the opcode.

The result of this design of Intel processors before the addition of the present invention is that prefix bytes are handled separately from the remainder of the instruction, and each prefix byte requires one extra clock to process. Moreover, because prefix bytes are not passed through the I485 unit to following stages of the pipeline but only affect the operation of the decode circuitry 21, prefix bytes are counted apart from other instruction bytes and are not included in the process of the decode circuitry 21 by which the position of instruction pointers are determined. Nor does the decoding of a prefix byte generate a request to the A Unit to transfer a microcode vector.

As was pointed out above, jump instructions used by the Intel microprocessors are of a number of different types. However, most of the jump instructions used by Intel processors do not include a prefix field in the instruction. Consequently, these jump instruction do not bear the burden of a one clock decode time for a prefix; and all of these instructions may be decoded in the normal one clock decoding time.

The type of jump instruction which differs from the norm is an instruction having a prefix field, an opcode field, and a displacement field. The prefix field always contains a OFhex value which indicates to the decode unit 22 that the normal microcode vector produced by the opcode is not to be generated but a different microcode vector is to be generated to produce a jump operation. In the circuit of FIG. 2, the OF prefix essentially causes the decoder to look to another section of the microcode generating circuit 24 to produce the output microvector. FIG. 1(b) illustrates the coding for a "Jump on Less or Equal/Not Greater" instruction, while FIG. 1(c) illustrates the coding for a "Move Register Memory to Segment Memory" instruction. The instruction illustrated in FIG. 1(b) is such an OF jump instruction (as the first eight bits demonstrate).

In the decoding unit 22 of the prior art Intel microprocessors (e.g., i486), the OF prefix portion of this second type of jump instruction is treated as are other prefixes and requires a separate operation by one of the individual state machines (the OF prefix state machine) within the prefix state machine 23 for processing. The OF prefix state machine provides the signal to the decode circuitry 21 which maps the opcode bytes to an alternate opcode space so that the change in the decode operation is implemented. The operation of the OF prefix state machine does not produce a microcode vector but rather a signal which causes the decode circuitry 21 to vary the microcode vector which would be produced by the microcode generating circuitry 24 without the prefix. However, because each prefix byte requires an extra clock to process before any vector can be generated by the decoder, these OF jump instructions slow the operation of the microprocessor.

Figure 3:
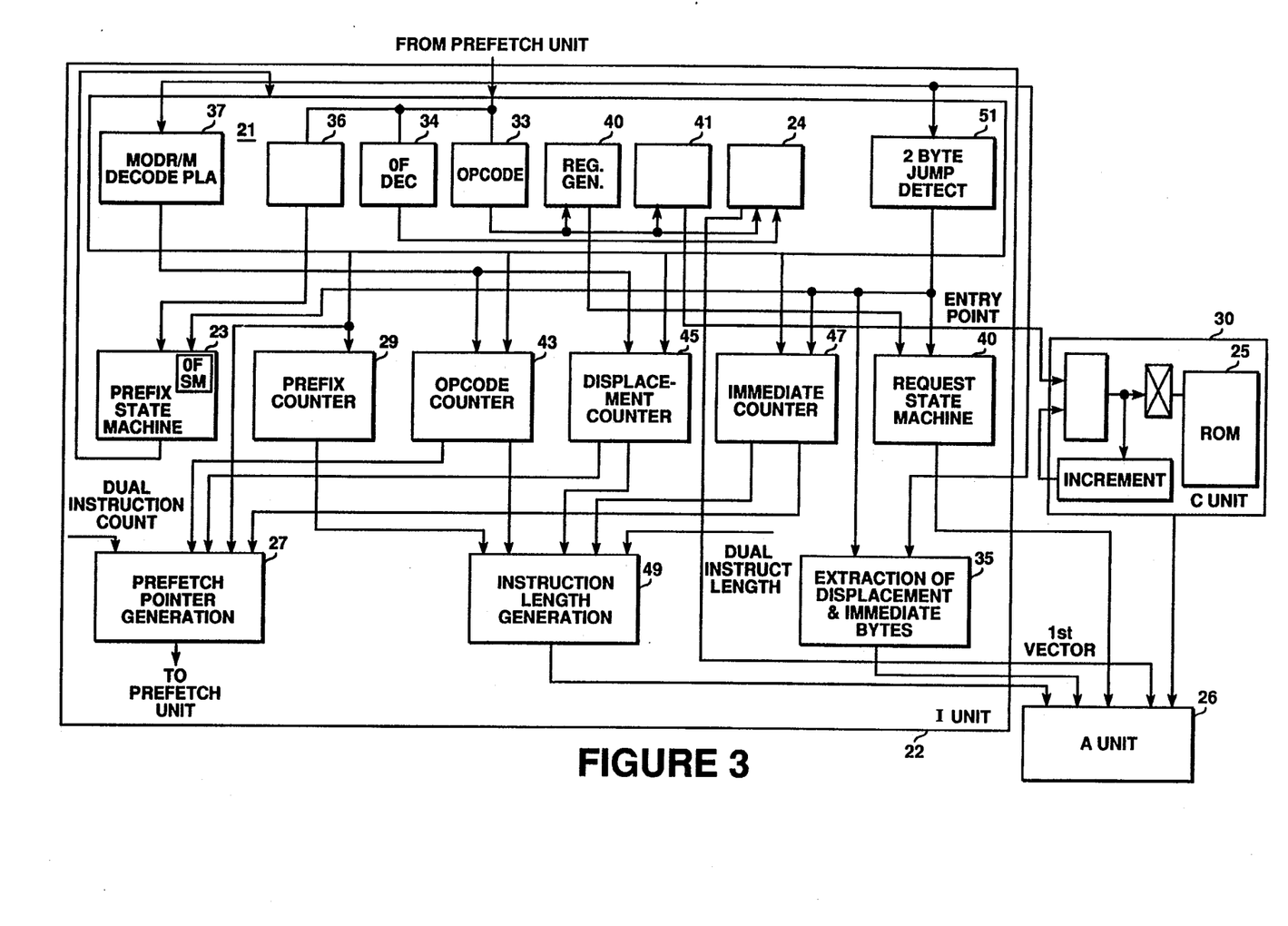
FIG. 3 is a block diagram of a portion of a microprocessor which may utilize the present invention to accelerate the processing of instructions illustrating changes made by the invention.

The present invention illustrated in FIG. 3 provides apparatus and a method for reducing the processing time of such prefixed jump instructions so that they may be decoded in a single clock period. FIG. 3 presents a much more detailed block diagram of the circuitry of the decode unit 22 utilized by the processor of which the present invention is a part.

The I unit decode circuit 21 is, as pointed out, a large PLA which generates signals to select the correct microcode to be sent to the succeeding stages of the pipeline. The decode circuit 21 includes a number of logically distinct portions for decoding the different portions of the instructions furnished. These include a portion 33 for decoding the normal one byte opcode field, a new portion 34 for decoding the two byte opcode OF jump instructions, and a portion 37 for decoding the MODR/M field and the SIB byte. A separate circuit 35 for extracting the data from the instruction which constitutes the displacement field and for extracting the data from the instruction which constitutes the immediate field is illustrated apart from the decode circuit 21 but in one embodiment is a physical part thereof. In addition, another portion 36 detects that a prefix in present and signals the prefix state machine the type of prefix which is involved so that the particular one of the prefix state machines may generate signals for affecting the meaning of the instruction. Another portion 41 of the decode circuit 21 generates an entry point which is sent to the C unit 30 in order to generate a sequence of microinstructions from microcode ROM for instructions which involve more than a single microcode vector. It should be noted that the OF prefixed jump instruction does not require the use of the C unit 30 since only a single microcode vector is generated and that is generated by the I unit 22.

In the embodiment of the invention shown, the microcode generating circuitry 24 (which is shown in FIG. 2 as an independent section of ROM) is incorporated as a portion of the large PLA which is decode circuit 21. Thus the decoding of the opcode and its related portions causes the generation of a microcode vector by the circuit 21.

The circuit 21 also includes a prefix counter circuit 29 (shown separate from the prefix state machine in this figure) for holding the number of prefix bytes which are a part of the instruction, an opcode counter circuit 43 for totalling the number of bytes which are a part of the opcode, a displacement counter circuit 45 for totalling the number of bytes of displacement data in the instruction, and an immediate counter circuit 47 for totalling the number of bytes of immediate data in the instruction. These circuits provide their count values to a prefetch pointer generation circuit 27 which generates a value sent back to the prefetch unit to indicate the beginning of the next instruction and to an instruction length generation circuit 49 which generates a value sent down the pipeline to indicate the length of the instruction being processed.

The general operation of the circuit 21 (ignoring for the moment the present invention) is as follows. When an instruction is transferred to the circuit 21 for decoding by the prefetch unit, if the instruction includes any prefix, this is detected by the circuit 36 which signals the prefix state machine 23 so that the particular prefix state machine for that prefix may be activated. If the prefix is OF (in the absence of the present invention), a delayed signal is sent to the decode circuit 21 so that the circuit 33 selects the microcode vector appropriate to the OF prefixed instruction. The circuit 21 then decodes the opcode byte and the middle three bits of the MODR/M field. From these bits, the opcode itself is determined and any microcode vectors necessary are generated. Simultaneously, the MODR/M byte is decoded by the circuit 37. The MODR/M byte indicates whether there is a MODR/M byte present and whether there is a SIB byte. Simultaneously, the SIB byte is also decoded by the section 37. If the opcode indicates that the instruction includes a MODR/M byte, then the output of the MODR/M decode section 37 is extracted and utilized. Similarly, if the MODR/M byte indicates the presence of a SIB byte, then the SIB output of the MODR/M decode section is extracted and utilized. Otherwise, the outputs of the MODR/M and SIB decode section are generated but are not used.

The decoding of the opcode causes the generation of the necessary microcode vectors necessary to carry out the instruction. The opcode with the MODR/M and SIB bytes indicate where various operands of the instruction are stored. The combination decoded from the opcode, MODR/M, and SIB fields indicate the length of the instruction which is the opcode. The opcode and the MODR/M fields together indicate whether there are displacement bytes in the instruction and how many there are. The opcode by itself also determines the number of bytes of immediate code in the instruction. This allows the position of any displacement value and any immediate value to be determined and these values to be extracted from the correct positions in the instruction so that they may be transferred to the pipeline.

In order to accelerate the processing of OF type jump instructions, the present invention provides two additional decoding circuits. First, the programmed logic array of the decode circuitry 21 itself is provided with additional logic circuitry 34 to recognize both the OF prefix and the following opcode byte as a single two byte opcode and to handle the operation of decoding the entire two byte OF jump instruction. In this manner, the decode circuitry 21 is able to route the prefixed instruction to another portion of the microvector generating circuit 24 where the OF jump microvector is generated. The two bytes of OF prefixed opcode are transferred to this additional logic circuitry 34 in the decode circuitry 21. The circuitry 34 decodes the prefixed jump instruction and causes a different portion of the microcode generating circuit 24 to issue the appropriate microvector for the OF jump instruction.

Second, a new 2 byte jump detect circuit 51 is provided to detect the presence of OF prefix jump instructions. When the circuit 51 detects a OF prefix jump instruction, it generates a signal which disables the OF prefix state machine of the prefix state machine 23 so that the OF prefix state machine does not respond to the signal provided by the circuit 36 of the decode circuitry 21 when OF prefixed instructions appear. Because of this, the OF prefix state machine does not produce the usual delayed signal to cause the opcode of the instruction to be mapped by the circuitry 33 of the decode circuitry 21 to an alternate opcode space causing a different microinstruction vector to be generated by the microcode generating circuit 24.

As a result of disabling the OF prefix state machine, no signal is provided to the prefix count state machine 29 to cause it to generate a length count for the pipeline which includes the prefix byte. Moreover, since the prefix bytes were never a part of the opcode in earlier microprocessors, the prefix bytes were not counted by the counting circuit of the I unit 22 for determining the length of the prefetch pointer. Since the prefix code is now transferred as a part of the opcode to the new section 34 of the decode circuit 21 along with the normal opcode portion of the instruction, the prefix byte adds to the length of the instruction handled by the decode circuit 21. This causes the code decoded by the circuit 21 to be one byte longer. However, there is no method provided in the decoder unit 22 to count this portion of the instruction length. This additional length must be included in the value determined by the instruction pointer so that a correct value will be transferred to the prefetch unit 20 which fetches the instructions for the decoder. To provide for counting the OF prefix byte in the length of the instruction, new circuitry is provided which corrects the length which would normally be measured by the decode unit 22 to assist in the generation of the length value. This allows the length of the instruction to be transferred to the pipeline and also the beginning of the next instruction to be correctly determined for the prefetch pointer.

The addition of the length of the prefix byte to the length count is accomplished by using the signal generated by the new OF jump detect circuit 51 of the decoding unit 22. The OF jump detect circuit 51 decodes the first two bytes of the instruction simultaneously with the decoding by the circuit 34 and, if a OF prefix is encountered, provides an output signal. This output signal is transferred directly to the immediate count circuit to indicate an immediate field of one byte. It will be recalled that none of the OF jump instructions have an immediate field. Consequently, when the one byte value is counted in the immediate field, it causes that field to be added as an additional byte to the length of the instruction by both the prefetch pointer generation circuit 27 and the instruction length generation circuit 49. This corrects the computation of the length of the instruction handled by the these circuits so that a correct pointer is generated to the next instruction and the correct length is also transferred to the pipeline.

It will also be recalled that the prefix bytes do not cause the decode circuitry 21 to generate a request to the A unit 26 to transfer the microcode to the pipeline. To remedy this lack with the OF prefixed jump instructions, the signal produced by the decoding circuitry 51 also causes a request state machine 40 to generate the normal request signal to the A unit 26 (the sequencer) so that a prefixed jump instruction is, in fact, handled in the same manner as are non-prefixed instructions.

Additionally, the signal generated by the new OF jump detect circuitry 51 is used to cause the decode unit 22 to add one byte to the length of the opcode in order to extract the correct bytes of any displacement value in the displacement field. The decoder unit 22 includes a circuit 35 which receives the instruction directly from the prefetch unit 20, decodes the instruction, and extracts any displacement value and any immediate value from the instruction. The displacement value and the immediate value are data values which are not translated but are merely extracted from the instruction and sent to the succeeding stages of the pipeline. Consequently, the extraction circuit 35 translates the values of the opcode, ModR/M, and SIB bytes and determines the length of any displacement value and any immediate value and where they start in the instruction. However, this information does not include any prefix information so for OF prefixed jump instructions, the count of the displacement starting point is incorrect by one byte. Since the displacement field is extracted before any immediate field, the extra byte count added to the immediate field cannot be used for incrementing this displacement extraction. In order to determine the correct point at which the displacement field begins in an OF jump instruction which has an extra byte in the opcode, the signal from the circuit 51 is used to provide an additional byte count. This additional count assures that the displacement value starts and ends at the correct points in the instruction so that it is correctly extracted.

The decoded microcode vector is then ready to be transferred to the pipeline by the A Unit, and a request for this transfer is outstanding to the A Unit. In this manner, the present invention causes a prefixed jump instruction to be decoded in a single clock period and eliminates the one clock delay caused by such an instruction in previous processors.

It should be noted that the present invention is intended to be used in a superscaler processor which includes two separate processing channels. Such a processor is discussed in detail in the patent application *Rotators in Machine Instruction Length Calculations*, referred to above. In such a processor, the arrangement of the present invention for providing one clock processing of OF jump instructions is duplicated in each of the processing channels. The fact of this duplication allows both of the two channels to process OF prefixed jump instructions and, consequently, the entire processor to process instructions faster.

Figure 4:
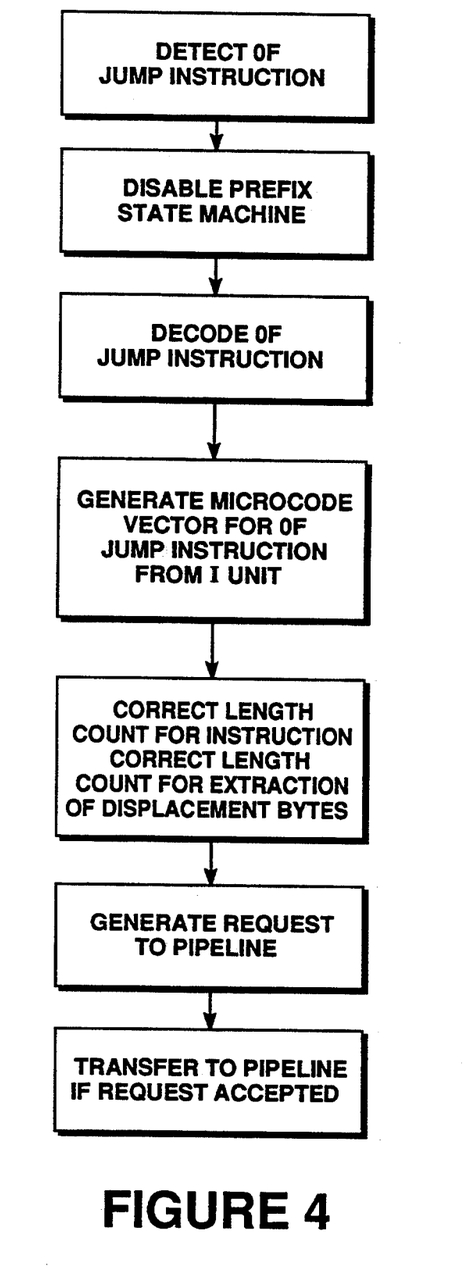
FIG. 4 is a flow chart illustrating the process of the invention.

FIG. 4 illustrates the steps of the method of the present invention. A number of the steps illustrated as occurring in sequence actually occur simultaneously, and that fact is noted in this discussion. At a first step, the present invention utilizes logic in the 2 byte jump detect circuit 51 to detect an OF jump instruction. The detection causes a signal to be generated which is used to disable the OF prefix portion of the prefix state machine. The OF jump instruction is simultaneously decoded using the OF jump decode portion 34 of the decode circuitry 21 which selects the vector from a different portion of the microcode generating circuitry 24 than would be used for the unprefixed instruction. The microcode vector for the OF jump instruction is then generated. Simultaneously, the signal generated by the 2 byte jump detection circuit 51 causes the extraction of the displacement bytes to begin at the correct point of the instruction. The same signal is used to cause the immediate counter 47 to register a one byte count so that the instruction appears to include an immediate byte. This additional count causes the length count to be incremented by one. Additionally, the signal generated by the circuit 51 causes the circuit 35 to select the displacement bytes at the correct position for extraction. Simultaneously, the signal from the circuit 51 causes a request to be generated by the circuit 40 and went to the controller unit 26 for access to the pipeline. Finally, the jump instruction microvector is transferred to the pipeline when the request is accepted. Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a pipelined microprocessor which includes a prefetch unit for obtaining a plurality of instructions to be processed;
   a decode unit having a prefix state machine for decoding prefixes to instructions and determining their lengths, a decode circuit for decoding instructions and generating microcode vectors to be executed, the decode circuit being responsive to signals from the prefix state machine to vary the microcode vector generated, and means for counting the length of an instruction; and
   a microcontroller for sequencing microcode vectors; the improvement comprising:
   means for detecting the appearance of a particular prefixed instruction,
   means responsive to the detection of the particular prefixed instruction for disabling the prefix state machine,
   means in the decode circuit for decoding the particular prefixed instruction and causing the decode circuit to generate microcode vectors for the instruction, and
   means for generating a request to the microcontroller for microcode vectors generated.

2. In a pipelined microprocessor as claimed in claim 1, the improvement further comprising means for causing the means for counting to include the length of a prefix in any length counted for the particular prefixed instruction.

3. In a pipelined microprocessor as claimed in claim 2, the means for causing the means for counting to include the length of a prefix in any length counted for the particular prefixed instruction comprising means for generating a signal in response to the detection of the particular prefixed instruction for increasing the length count.

4. In a pipelined microprocessor as claimed in claim 3, the improvement further comprising means for utilizing the signal generated in response to the detection of the particular prefixed instruction for increasing the length count to indicate that a byte of instruction exists in an unused field of an instruction being processed.

5. In a pipelined microprocessor as claimed in claim 3, the improvement further comprising means for utilizing a count of the length of an instruction to indicate the length of the instruction to remaining stages in the pipeline.

6. In a pipelined microprocessor as claimed in claim 3, the improvement further comprising means for utilizing a count of the length of an instruction to indicate the length of the instruction to a prefetch unit.

7. In a pipelined microprocessor as claimed in claim 3, the improvement further comprising means for increasing a count value for the opcode in order to provide correct extraction of another field of the instruction.

8. The method of decoding a prefixed jump instruction in a single clock period in an Intel microprocessor having a state machine for detecting and decoding prefixes apart from the decoding of instructions of which they are a part in a decoder circuit, the decoder circuit normally generating a count of the bytes of the instruction not including any prefix bytes for generating a prefetch pointer, comprising the steps of detecting the presence of a prefixed jump instruction, disabling the state machine in response to the detection of the prefixed jump instruction, decoding the prefixed jump instruction in the decoder circuit, generating a microcode vector for the decoded prefixed jump instruction, and increasing the count of the number of bytes in the decoded instruction by one byte.

9. The method of decoding a prefixed jump instruction in a single clock period in an Intel microprocessor as claimed in claim 8 in which the step of increasing the count of the number of bytes in the decoded instruction by one byte comprises the step of providing a signal in response to the detection of the prefixed jump instruction to indiacate that a byte of instruction exists in an unused field of the decoded instruction, and counting the byte of instruction in the unused field of the decoded instruction in determining the count of the number of bytes in the decoded instruction.

10. The method of decoding a prefixed jump instruction in a single clock period in an Intel microprocessor as claimed in claim 8 in which the unused field of the decoded instruction is the immediate field.

* * * * *